United States Patent
Wu et al.

(10) Patent No.: US 12,387,469 B2
(45) Date of Patent: Aug. 12, 2025

(54) OBJECT DETECTION MODEL TRAINING APPARATUS, METHOD, AND NON-TRANSITORY COMPUTER READABLE STORAGE MEDIUM THEREOF

(71) Applicant: Realtek Semiconductor Corporation, Hsinchu (TW)

(72) Inventors: Chun-Chang Wu, Hsinchu (TW); Shih-Tse Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 460 days.

(21) Appl. No.: 17/811,303

(22) Filed: Jul. 7, 2022

(65) Prior Publication Data
US 2023/0096697 A1 Mar. 30, 2023

(30) Foreign Application Priority Data
Sep. 29, 2021 (TW) ................................ 110136184

(51) Int. Cl.
*G06V 10/774* (2022.01)
*G06N 20/00* (2019.01)
*G06V 20/64* (2022.01)

(52) U.S. Cl.
CPC ......... *G06V 10/7747* (2022.01); *G06N 20/00* (2019.01); *G06V 20/64* (2022.01)

(58) Field of Classification Search
CPC .. G06V 10/7747; G06V 20/64; G06V 10/774; G06N 3/08; G06T 2207/20081; G06T 2207/20084
See application file for complete search history.

(56) References Cited

U.S. PATENT DOCUMENTS

2023/0078218 A1* 3/2023 Wang .................... G06N 3/098
706/12

FOREIGN PATENT DOCUMENTS

CN 112232420 A 1/2021

OTHER PUBLICATIONS

Learning from Multiple Teacher Networks: by Shan You et al., 2017 (Year: 2017).*
Mingxing Tan et al., "EfficientNetV2: Smaller Models and Faster Training," arXiv:2104.00298v3 [cs.CV], Jun. 23, 2021.
Hang Yu et al., "PDA: Progressive Data Augmentation for General Robustness of Deep Neural Networks," arXiv:1909.04839v3 [cs. LG] Feb. 24, 2020.
Alexey Bochkovskiy et al., "YOLOv4: Optimal Speed and Accuracy of Object Detection," arXiv:2004.10934v1 [cs.CV] Apr. 23, 2020.

* cited by examiner

*Primary Examiner* — Gregory A Morse
*Assistant Examiner* — Ty Mitchell Beatty
(74) *Attorney, Agent, or Firm* — CKC & Partners Co., LLC

(57) ABSTRACT

An object detection model training apparatus, method and non-transitory computer readable storage medium thereof are provided. The apparatus performs a first object detection on a plurality of training images to generate a piece of first label information corresponding to each of the training images by a first teacher model. The apparatus trains a student model based on the training images and the first label information. The apparatus performs a second object detection on the training images to generate a piece of second label information corresponding to each of the training images by a second teacher model. The apparatus trains the student model based on the training images and the second label information.

17 Claims, 6 Drawing Sheets

OBJECT DETECTION MODEL TRAINING APPARATUS, METHOD, AND NON-TRANSITORY COMPUTER READABLE STORAGE MEDIUM THEREOF

CROSS-REFERENCE TO RELATED APPLICATION

This application claims priority to Taiwan Application Serial Number 110136184, filed Sep. 29, 2021, which is herein incorporated by reference in its entirety.

BACKGROUND

Field of Invention

The present invention relates to an object detection model training apparatus, method, and non-transitory computer readable storage medium thereof. More particularly, the present invention relates to an object detection model training apparatus, method, and non-transitory computer readable storage medium thereof for progressive learning.

Description of Related Art

Object detection is an important field in machine vision. In the prior art, training an object detection model by deep learning may require a huge amount of training data, and the training data may comprise both difficult and simple samples at the same time. However, when training the object detection model (especially in a small, lightweight object detection model), the difficulty of detecting objects in the image may be different. Therefore, if there are no restrictions in the learning stage while learning the training data at the same time, the learning process may excessively focus on the learning of difficult samples, and thus the training results may result in instability of deep learning or low learning results.

For example, when the shape of a car is the learning target of the object detection model, an image of the training data may contain objects that are clear and easy to learn, as well as objects that are small in area, blurry, and the shape of a car is partially obscured. If object detection learning is performed at the same time, it will cause the burden of deep learning.

In addition, for the huge amount of training data, it is generally necessary to label the position of the object in the image by a human. Since the human labeling process is complicated, it may consume a lot of manual labeling costs and time.

Accordingly, there is an urgent need for a technology that can train the object detection model efficiently and automatically.

SUMMARY

An objective of the present disclosure is to provide an object detection model training apparatus. The object detection model training apparatus comprises a storage, a transceiver interface, and a processor, and the processor is electrically connected to the storage and the transceiver interface. The storage is configured to store a student model and a plurality of teacher models, wherein the teacher models at least comprise a first teacher model and a second teacher model. The processor receives a plurality of training images from the transceiver interface, wherein the training images correspond to an object category. The processor performs a first object detection of the object category on the training images to generate a piece of first label information corresponding to each of the training images by the first teacher model. The processor trains the student model based on the training images and the first label information. The processor performs a second object detection of the object category on the training images to generate a piece of second label information corresponding to each of the training images by the second teacher model. The processor trains the student model based on the training images and the second label information, wherein a second object labeled quantity of the second label information corresponding to each of the training images is not less than a first object labeled quantity of the first label information corresponding to each of the training images.

Another objective of the present disclosure is to provide an object detection model training method, which is adapted for use in an electronic apparatus. The electronic apparatus comprises a storage, a transceiver interface and a processor. The storage stores a student model and a plurality of teacher models, and the teacher models at least comprise a first teacher model and a second teacher model. The object detection model training method is performed by the processor. The object detection model training method comprises following steps: receiving a plurality of training images, wherein the training images correspond to an object category; performing a first object detection of the object category on the training images to generate a piece of first label information corresponding to each of the training images by the first teacher model; training the student model based on the training images and the first label information; performing a second object detection of the object category on the training images to generate a piece of second label information corresponding to each of the training images by the second teacher model; and training the student model based on the training images and the second label information, wherein a second object labeled quantity of the second label information corresponding to each of the training images is not less than a first object labeled quantity of the first label information corresponding to each of the training images.

A further objective of the present disclosure is to provide a non-transitory computer readable storage medium having a computer program stored therein. The computer program comprises a plurality of codes, the computer program executes an object detection model training method after being loaded into an electronic computing apparatus. The electronic computing apparatus stores a student model and a plurality of teacher models, and the teacher models at least comprise a first teacher model and a second teacher model. The object detection model training method comprises following steps: receiving a plurality of training images, wherein the training images correspond to an object category; performing a first object detection of the object category on the training images to generate a piece of first label information corresponding to each of the training images by the first teacher model; training the student model based on the training images and the first label information; performing a second object detection of the object category on the training images to generate a piece of second label information corresponding to each of the training images by the second teacher model; and training the student model based on the training images and the second label information, wherein a second object labeled quantity of the second label information corresponding to each of the training images is not less than a first object labeled quantity of the first label information corresponding to each of the training images.

According to the above descriptions, the object detection model training technology (at least including the apparatus, the method, and the non-transitory computer readable storage medium) provided by the present disclosure uses a plurality of teacher models for the same set of training images to generate different intensities of label information corresponding to each of the training images. The object detection model training technology starts the learning from simple label information, and then learns more difficult label information. The object detection model is trained through a progressive learning method. Therefore, the present disclosure can solve the problem that the conventional technology may cause the instability of deep learning or the learning results not as expected due to the different difficulty of the training image samples. In addition, since the present disclosure does not require humans involved in the training process, the present disclosure solves the shortcomings of the conventional object detection technology that requires manual labeling before learning.

The detailed technology and preferred embodiments implemented for the subject invention are described in the following paragraphs accompanying the appended drawings for people skilled in this field to well appreciate the features of the claimed invention.

DETAILED DESCRIPTION

In the following description, an object detection model training apparatus, method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
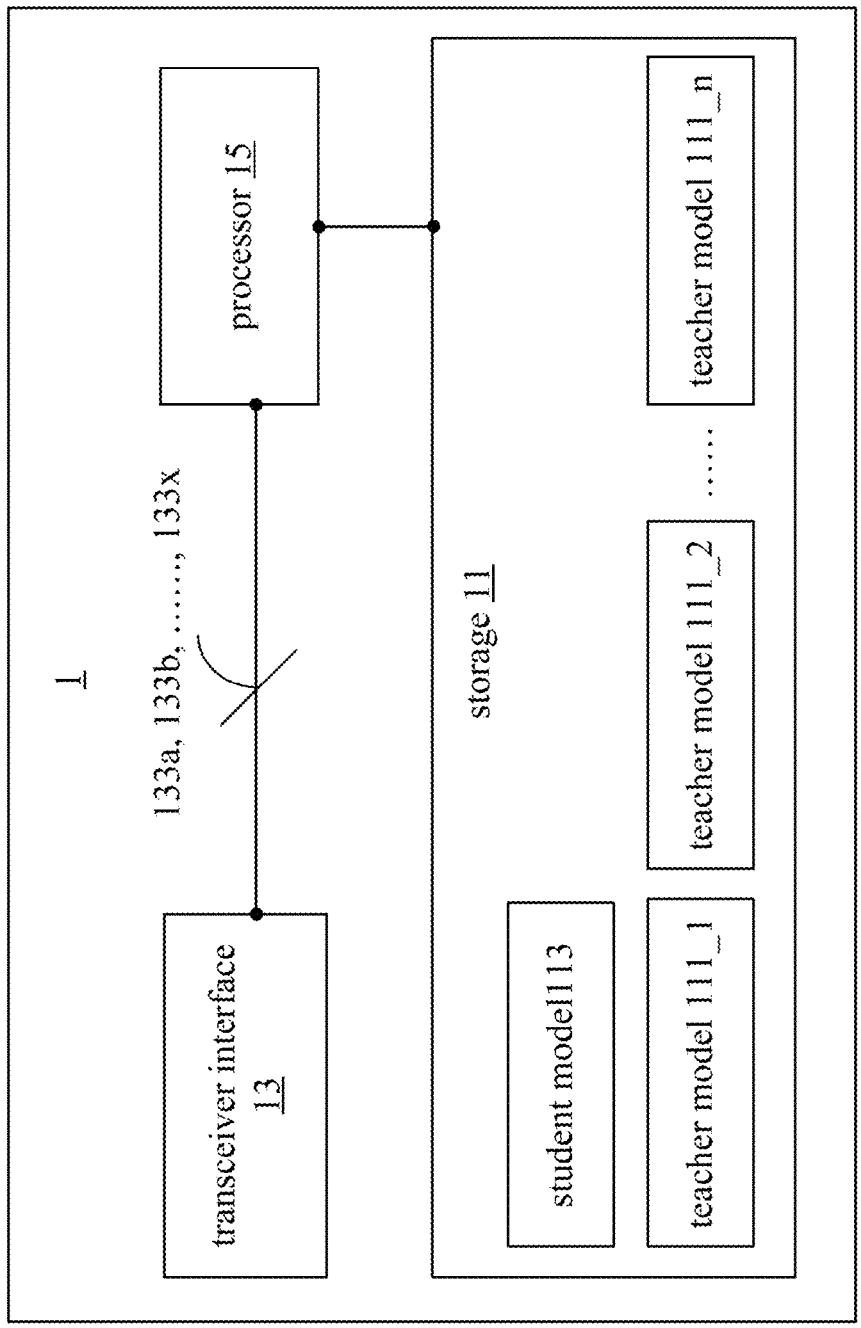
FIG. 1 is a schematic view depicting an object detection model training apparatus of the first embodiment.

A first embodiment of the present disclosure is an object detection model training apparatus 1 and a schematic view of which is depicted in FIG. 1. The object detection model training apparatus 1 comprises a storage 11, a transceiver interface 13 and a processor 15, wherein the processor 15 is electrically connected to the storage 11 and the transceiver interface 13. The storage 11 may be a memory, a Universal Serial Bus (USB) disk, a hard disk, a Compact Disk (CD), a mobile disk, or any other storage medium or circuit known to those of ordinary skill in the art and having the same functionality. The transceiver interface 13 is an interface capable of receiving and transmitting data or other interfaces capable of receiving and transmitting data and known to those of ordinary skill in the art. The transceiver interface 13 can receive data from sources such as external apparatuses, external web pages, external applications, and so on. The processor 15 may be any of various processors, Central Processing Units (CPUs), microprocessors, digital signal processors or other computing apparatuses known to those of ordinary skill in the art.

In the present embodiment, as shown in FIG. 1, the storage 11 stores a student model 113 and a plurality of teacher models 111_1, 111_2, . . . , 111_*n*, wherein n is a positive integer not less than 2. It shall be appreciated that the student model 113 is an object detection model to be trained, and each of the teacher models 111_1, 111_2, . . . , 111_*n* is an object detection model trained based on different intensity levels. For example, the teacher models 111_1, 111_2, . . . , 111_*n* can be one-stage YOLO (You Only Look Once) object detection models, SSD (Single Shot MultiBox Detector) object detection models, or other object detection models such as FasterRCNN, RetinaNet, Mask RCNN, CenterNet, PVANet, etc.

Specifically, the teacher models 111_1, 111_2, . . . , 111_*n* are respectively the object detection models from weak to strong in order. The teacher models 111_1, 111_2, . . . , 111_*n* are used to calculate the object frame of the object of interest (i.e., the object frame frames the position/coordinates of the object), and the object frame calculated by different teacher models can contain objects with different levels of difficulty. In the present embodiment, the teacher model 111_1 is the weakest object detection model but has the fastest calculation time, and the estimated object frame is the easiest to learn. The teacher model 111_*n* is the stronger object detection model but has a longer calculation time, and the teacher model 111_*n* can estimate the more difficult object frame.

Figure 2:
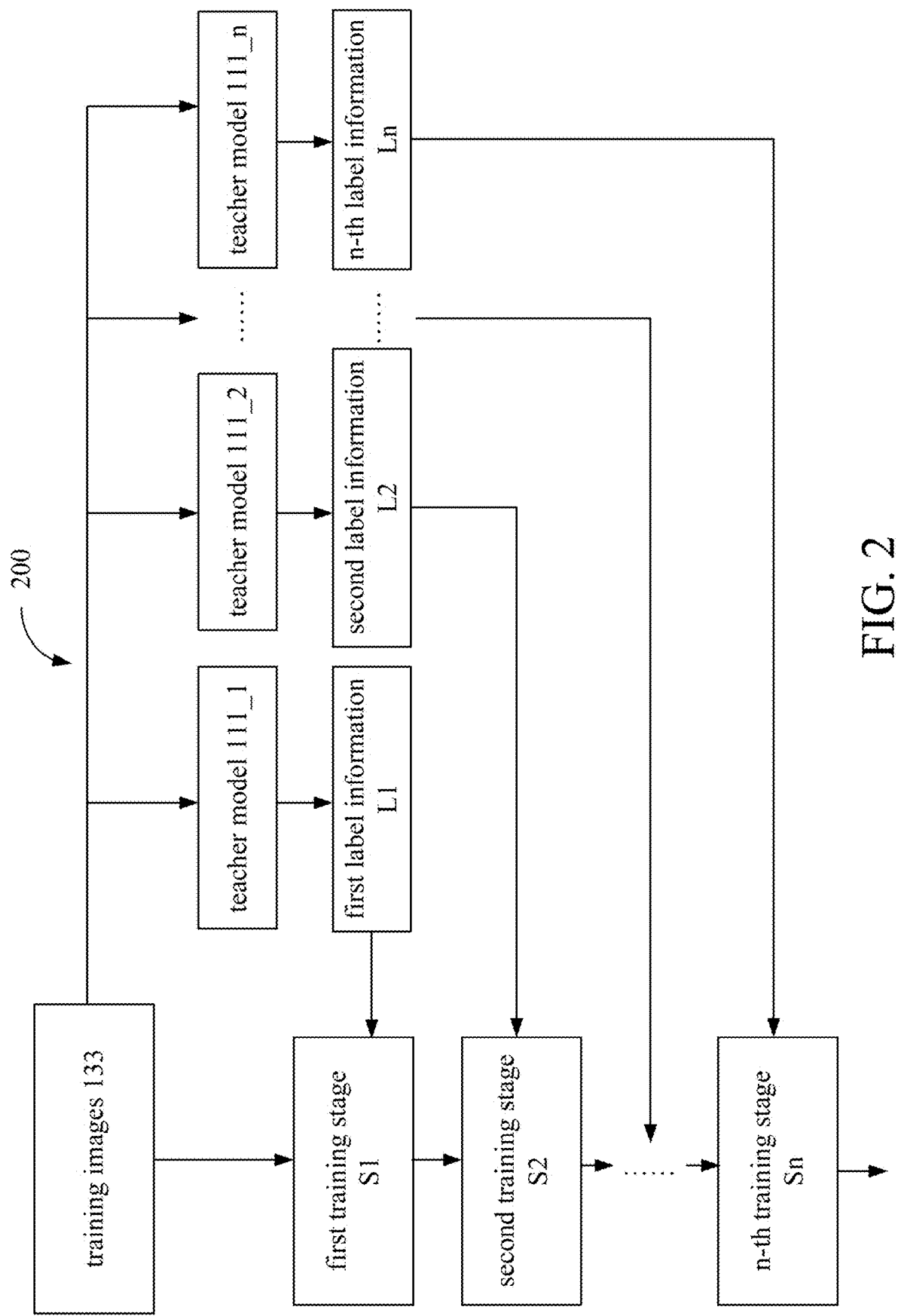
FIG. 2 is a schematic view depicting the progressive learning framework of the first embodiment.

In order to facilitate the understanding of the operating structure of the present disclosure, FIG. 2 is a progressive learning framework 200 proposed by the present disclosure. The progressive learning framework 200 is divided into n training stages, and the input data trained in each of the stages is the label information generated by different teacher models (i.e., object frames of different levels of difficulty), wherein n is a positive integer not less than 2, and n can be adjusted based on the scale of the overall operations.

As shown in FIG. 2, based on the same set of training images 133, the teacher models 111_1, 111_2, . . . , 111_*n* (which are ordered from weak to strong) automatically generate the first label information L1, the second label information L2, . . . , and the n-th label information Ln, respectively. At the first training stage S1, the object detection model training apparatus 1 trains the student model 113 based on the training images 133 and the first label information L1. At the second training stage S2, the object detection model training apparatus 1 trains the student model 113 based on the training images 133 and the second label information L2. By analogy, in the n-th training stage Sn, the object detection model training apparatus 1 trains the student model 113 based on the training images 133 and the n-th label information Ln. Accordingly, in different training stages, the present disclosure performs training based on the label information generated by teacher models of different intensity levels.

For ease of understanding, the following paragraphs will describe the embodiment with n is set to 2. In the present embodiment, the storage 11 stores the teacher model 111_1 and the teacher model 111_2 (hereinafter referred to as the first teacher model 111_1 and the second teacher model 111_2), and the object detection model training apparatus 1 performs the training operations comprising the first training stage S1 and the second training stage S2. It shall be appreciated that those of ordinary skill in the art shall appreciate the embodiments that when n is greater than 2 based on the descriptions in the following paragraphs. Therefore, the details will not be repeated herein.

The operations of the present embodiment will be specifically described below. First, the processor 15 receives a plurality of training images 133$a$, 133$b$, ..., 133$x$ from the transceiver interface 13 (for ease of explanation, the following paragraphs will use the training images 133 to represent all the training images 133$a$, 133$b$, ..., 133$x$), wherein the training images 133 corresponds to an object category. For example, when the object detection model to be trained is an object detection model used to detect cars, the training images 133 used to train the object detection model to be trained (i.e., the student model 113) should be images that correspond to the car object category.

Next, the object detection model training apparatus 1 performs the training of the first training stage S1 on the student model 113. Specifically, the processor 15 performs a first object detection of the object category on the training images 133 to generate a piece of first label information L1 corresponding to each of the training images 133 by the first teacher model 111_1. Subsequently, the processor 15 trains the student model 113 based on the training images 133 and the first label information L1.

It shall be appreciated that, based on the descriptions of the present disclosure, those of ordinary skill in the art of the present disclosure shall appreciate how to use the teacher model to detect training images to generate label information, and how to use the training images and corresponding label information to train the object detection model. Therefore, the details will not be repeated herein.

Next, the object detection model training apparatus 1 performs the training of the second training stage S2 on the student model 113. Specifically, the processor 15 performs a second object detection of the object category on the training images 133 to generate a piece of second label information L2 corresponding to each of the training images 133 by the second teacher model 111_2. Next, the processor 15 trains the student model 113 based on the training images 133 and the second label information L2, wherein a second object labeled quantity of the second label information L2 corresponding to each of the training images 133 is not less than a first object labeled quantity of the first label information L1 corresponding to each of the training images 133.

In some embodiments, the second label information L2 corresponding to each of the training images 133 at least comprises the first label information L1 corresponding to each of the training images 133.

Figure 3A:
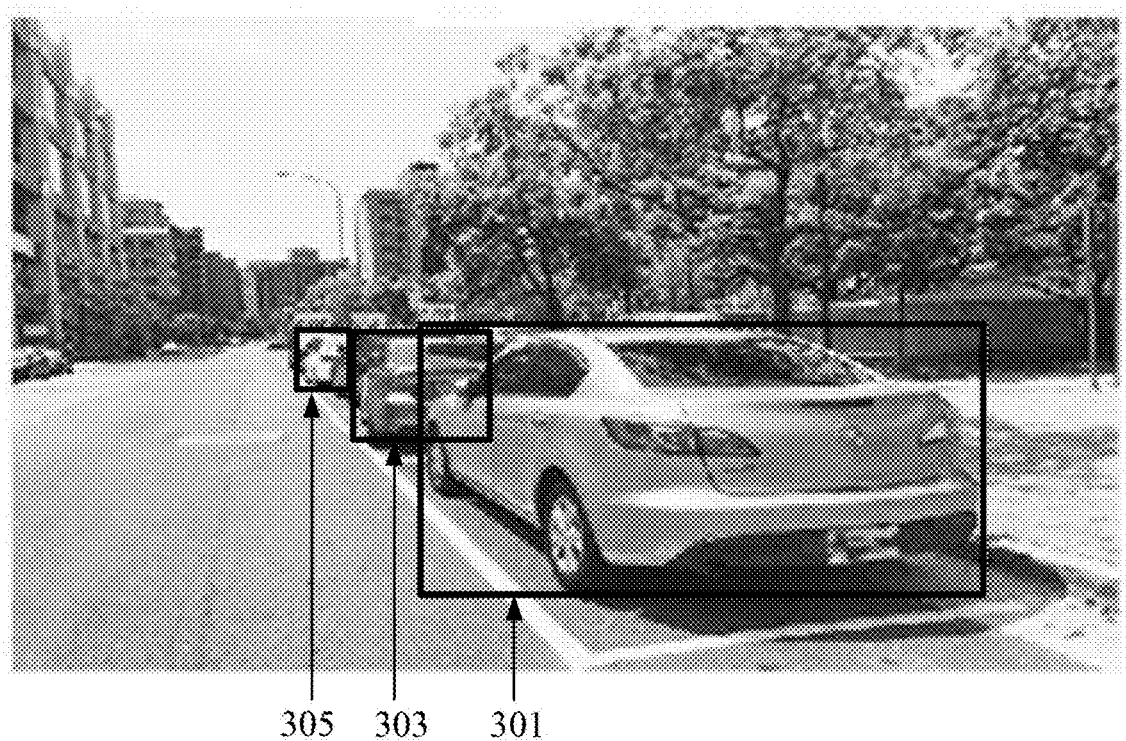
FIG. 3A is a schematic view depicting one kind of label information of the first embodiment.
Figure 3B:
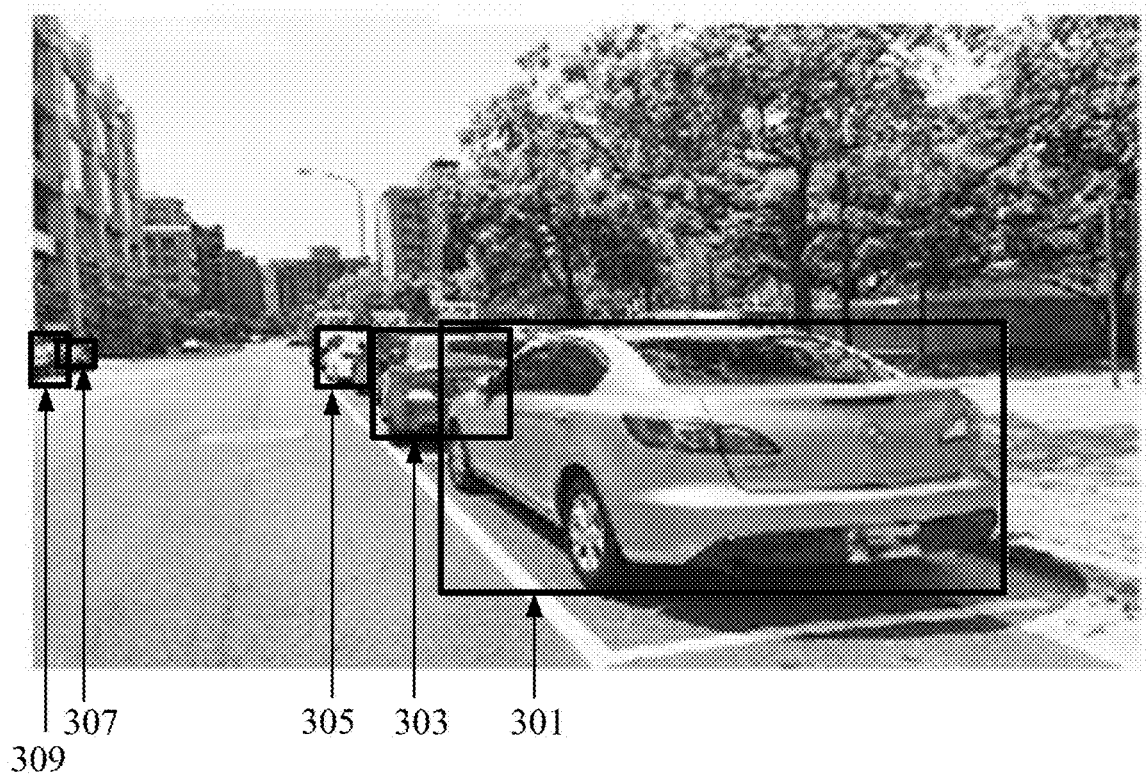
FIG. 3B is a schematic view depicting one kind of label information of the first embodiment.

For ease of understanding, a practical example is used for illustration, and please refers to FIGS. 3A and 3B at the same time. It shall be appreciated that FIGS. 3A and 3B are respectively the first label information L1 and the second label information L2 generated by the first teacher model 111_1 and the second teacher model 111_2 based on the same training image in the training images 133 (e.g., the training image 133$a$ in the training images 133). As shown in FIGS. 3A and 3B, the first label information L1 comprises the object 301, the object 303, and the object 305, and the second label information L2 comprises the object 301, the object 303, and the object 305, and further comprises the object 307 and the object 309 with the smaller area (i.e., objects that are more difficult to detect). For the same training image, the second object labeled quantity of the second label information L2 is 5, and the first object labeled quantity of the first label information L1 is 3.

In some embodiments, the object detection model training apparatus 1 further performs the third training stage based on a third teacher model with a stronger object detection ability than the teacher model 111_2. Specifically, the storage 11 further stores a third teacher model (not shown), and the processor 15 further performs a third object detection of the object category on the training images 133 to generate a piece of third label information corresponding to each of the training images 133 by the third teacher model. Next, the processor 15 trains the student model 113 based on the training images 133 and the third label information, wherein a third object labeled quantity of the third label information corresponding to each of the training images 133 is not less than the second object labeled quantity of the second label information L2 corresponding to each of the training images 133.

In some embodiments, the third label information corresponding to each of the training images 133 at least comprises the second label information L2 corresponding to each of the training images 133, and the second label information L2 corresponding to each of the training images 133 at least comprises the first label information L1 corresponding to each of the training images 133.

Figure 3C:
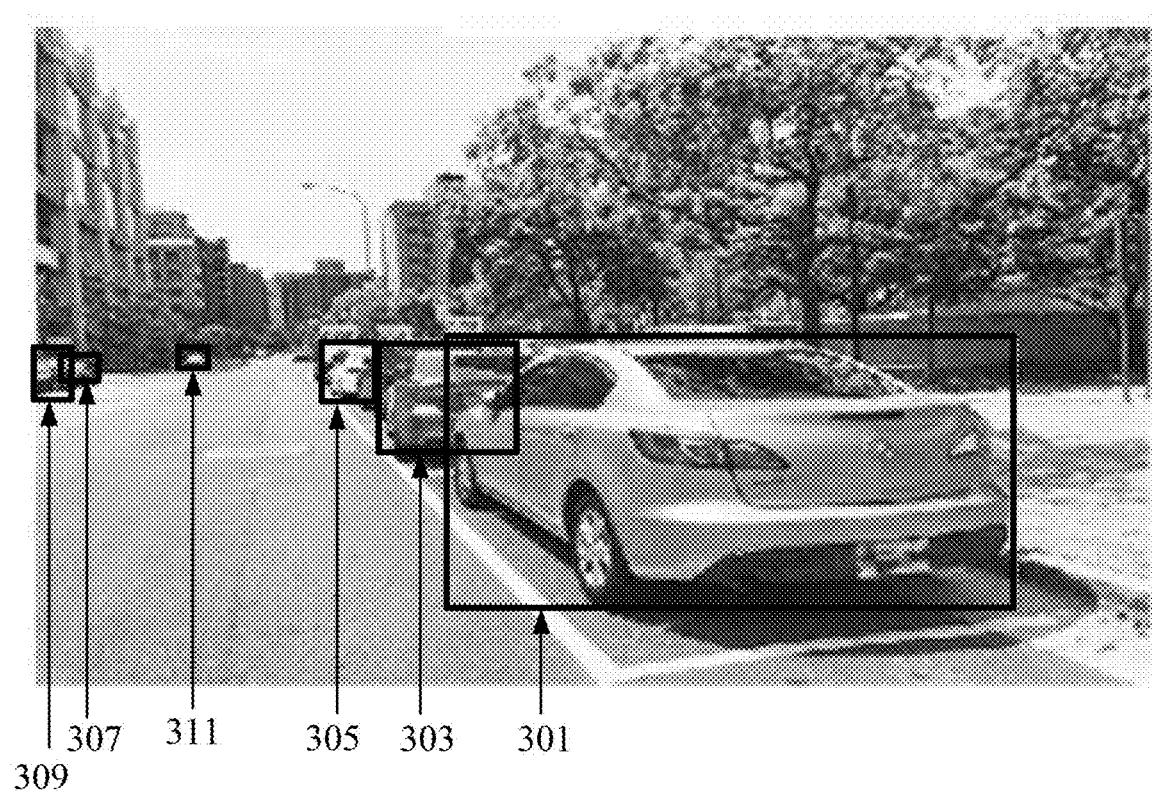
FIG. 3C is a schematic view depicting one kind of label information of the first embodiment.

To illustrate with a practical example, please refer to FIG. 3A, FIG. 3B, and FIG. 3C at the same time. It shall be appreciated that FIG. 3C is the label information generated by the third teacher model based on the same training image in the training images 133 (i.e., the same training image as the training image in FIG. 3A and FIG. 3B). As shown in FIG. 3A, FIG. 3B, and FIG. 3C, the first label information L1 comprises the object 301, the object 303, and the object 305. The second label information L2 comprises the object 301, the object 303, the object 305, the object 307, and the object 309. The third label information comprises the object 301, the object 303, the object 305, the object 307, and the object 309, and further comprises the object 311 with the smaller area (i.e., an object with higher detection difficulty). For the same training image, the third object labeled quantity of the third label information is 6, the second object labeled quantity of the second label information L2 is 5, and the first object labeled quantity of the first label information L1 is 3.

In some embodiments, each of the third label information comprises at least one third object coordinate corresponding to each of the training images 133, each of the second label information comprises at least one second object coordinate corresponding to each of the training images 133, and each of the first label information at least comprises at least one first object coordinate corresponding to each of the training images 133. For example, the form of the object coordinate can be represented by the X-axis and Y-axis coordinate values (e.g., x_min, x_max, y_min, y_max) that frame the object (i.e., the boundary that frames the object).

In some embodiments, the object detection model training apparatus 1 further performs n training stages based on n teacher models. Specifically, the storage 11 stores n teacher models, n is a positive integer not less than 2, and the processor 15 further performs the following operations: (a)

selecting an i-th teacher model from the n teacher models, and an initial value of i is 3; (b) performing an i-th object detection of the object category on the training images to generate a piece of i-th label information corresponding to each of the training images by the i-th teacher model; (c) training the student model based on the training images and the i-th label information, wherein a i-th object labeled quantity of the i-th label information corresponding to each of the training images is not less than a (i−1)-th object labeled quantity of a (i−1)-th label information corresponding to each of the training images; and (d) determining whether i is equal to n, and setting i to i+1 when i is not equal to n.

In some embodiments, the processor 15 repeatedly performs the operation (b), the operation (c), and the operation (d) until the processor 15 determines that i is greater than or equal to n.

In some embodiments, the i-th label information corresponding to each of the training images at least comprises the (i−1)-th label information corresponding to each of the training images.

According to the above descriptions, the object detection model training apparatus 1 provided by the present disclosure uses a plurality of teacher models for the same set of training images to generate different intensities of label information corresponding to each of the training images. The object detection model training apparatus 1 starts the learning from simple label information, and then learns more difficult label information. The object detection model is trained through a progressive learning method. Therefore, the present disclosure can solve the problem that the conventional technology may cause the instability of deep learning or the learning results not as expected due to the different difficulty of the training image samples. In addition, since the present disclosure does not require humans involved in the training process, the present disclosure solves the shortcomings of the conventional object detection technology that requires manual labeling before learning.

Figure 4:
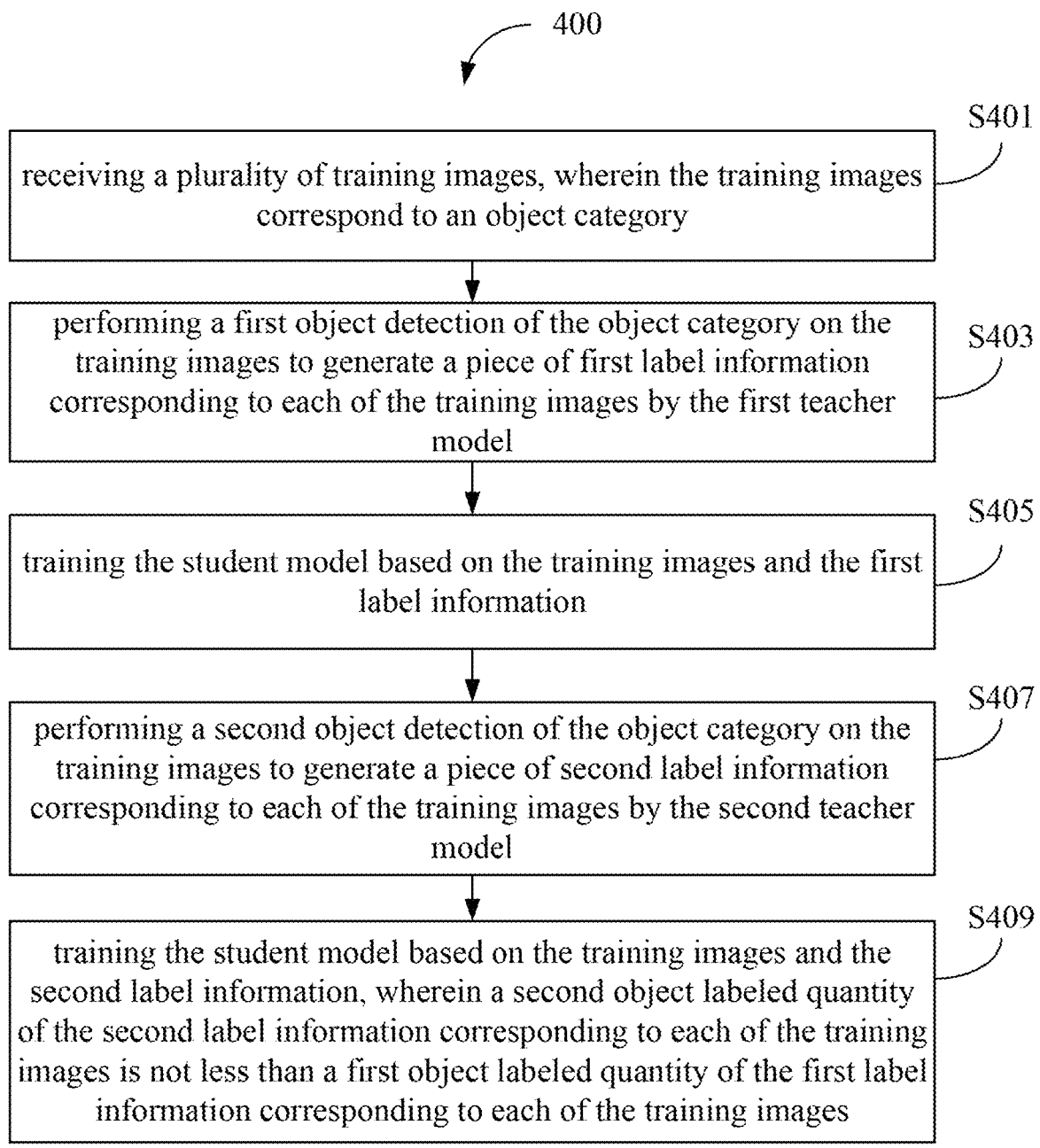
FIG. 4 is a partial flowchart depicting an object detection model training method of the second embodiment.

A second embodiment of the present disclosure is an object detection model training method and a flowchart thereof is depicted in FIG. 4. The object detection model training method 400 is adapted for an electronic apparatus, and the electronic apparatus comprises a storage, a transceiver interface and a processor. The storage stores a student model and a plurality of teacher models (e.g., the student model 113 and a plurality of teacher models 111_1, 111_2, ..., 111_n of the first embodiment, and the teacher models at least comprise a first teacher model and a second teacher model.). The object detection model training method 400 trains the object detection model through the steps S401 to S409.

In the step S401, the electronic apparatus receives a plurality of training images, wherein the training images correspond to an object category. In the step S403, the electronic apparatus performs a first object detection of the object category on the training images to generate a piece of first label information corresponding to each of the training images by the first teacher model.

In the step S405, the electronic apparatus trains the student model based on the training images and the first label information. In the step S407, the electronic apparatus performs a second object detection of the object category on the training images to generate a piece of second label information corresponding to each of the training images by the second teacher model. Next, in the step S409, the electronic apparatus trains the student model based on the training images and the second label information, wherein a second object labeled quantity of the second label information corresponding to each of the training images is not less than a first object labeled quantity of the first label information corresponding to each of the training images.

In some embodiments, the second label information corresponding to each of the training images at least comprises the first label information corresponding to each of the training images.

Figure 5:
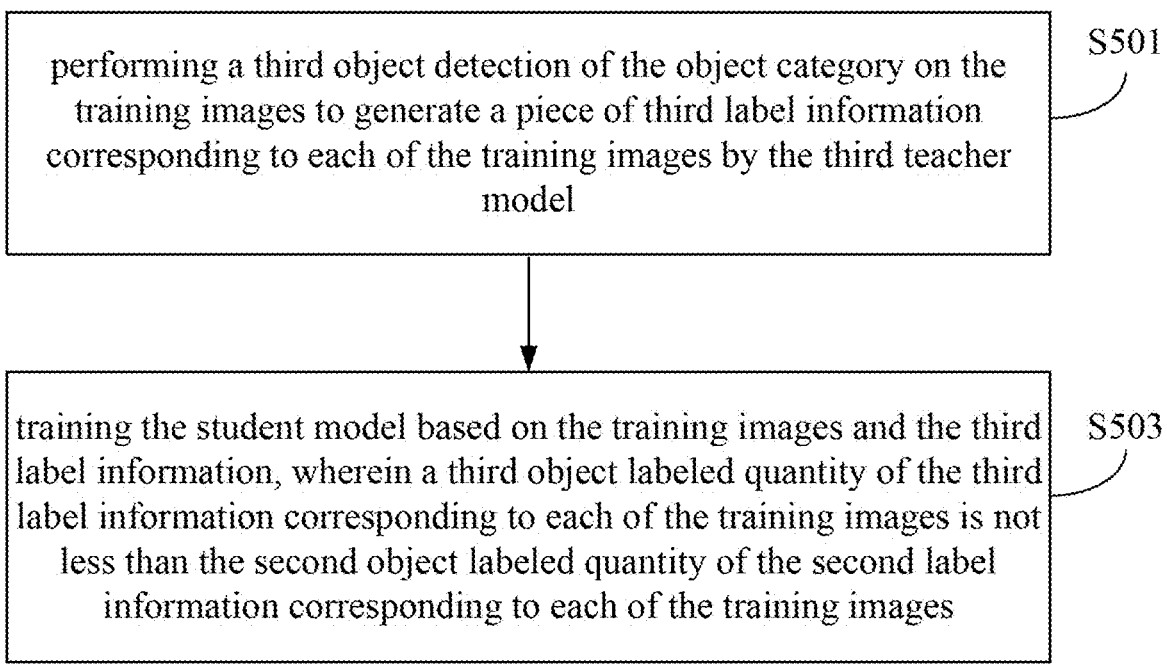
FIG. 5 is a partial flowchart depicting an object detection model training method of the second embodiment.

In some embodiments, the object detection model training 400 further comprises step S501 and step S503 as shown in FIG. 5. Specifically, the storage further stores a third teacher model. In the step S501, the electronic apparatus performs a third object detection of the object category on the training images to generate a piece of third label information corresponding to each of the training images by the third teacher model. In the step S503, the electronic apparatus trains the student model based on the training images and the third label information, wherein a third object labeled quantity of the third label information corresponding to each of the training images is not less than the second object labeled quantity of the second label information corresponding to each of the training images.

In some embodiments, the third label information corresponding to each of the training images at least comprises the second label information corresponding to each of the training images, and the second label information corresponding to each of the training images at least comprises the first label information corresponding to each of the training images.

In some embodiments, each of the third label information comprises at least one third object coordinate corresponding to each of the training images, each of the second label information comprises at least one second object coordinate corresponding to each of the training images, and each of the first label information at least comprises at least one first object coordinate corresponding to each of the training images.

In some embodiments, the storage stores n teacher models, n is a positive integer not less than 2, and the processor further performs following steps: (a) selecting an i-th teacher model from the n teacher models, and an initial value of i is 3; (b) performing an i-th object detection of the object category on the training images to generate a piece of i-th label information corresponding to each of the training images by the i-th teacher model; (c) training the student model based on the training images and the i-th label information, wherein a i-th object labeled quantity of the i-th label information corresponding to each of the training images is not less than a (i−1)-th object labeled quantity of a (i−1)-th label information corresponding to each of the training images; and (d) determining whether i is equal to n, and setting i to i+1 when i is not equal to n.

In some embodiments, the object detection model training method 400 further comprises following steps: repeatedly performing the step (b), the step (c), and the step (d) until the processor determines that i is greater than or equal to n.

In some embodiments, the i-th label information corresponding to each of the training images at least comprises the (i−1)-th label information corresponding to each of the training images.

In addition to the aforesaid steps, the second embodiment can also execute all the operations and steps of the object detection model training apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The object detection model training method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the object detection model training apparatus 1), the computer program executes the object detection model training method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., teacher models, object detection, label information, object labeled quantity, and object coordinate) are preceded by terms such as "first" and "second", and these terms of "first" and "second" are only used to distinguish these different words. For example, the "first" and "second" teacher models are only used to indicate the teacher models used in different stages.

According to the above descriptions, the object detection model training technology (at least including the apparatus, the method, and the non-transitory computer readable storage medium) provided by the present disclosure uses a plurality of teacher models for the same set of training images to generate different intensities of label information corresponding to each of the training images. The object detection model training technology starts the learning from simple label information, and then learns more difficult label information. The object detection model is trained through a progressive learning method. Therefore, the present disclosure can solve the problem that the conventional technology may cause the instability of deep learning or the learning results not as expected due to the different difficulty of the training image samples. In addition, since the present disclosure does not require humans involved in the training process, the present disclosure solves the shortcomings of the conventional object detection technology that requires manual labeling before learning.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. An object detection model training apparatus, comprising:
   a storage, being configured to store a student model and a plurality of teacher models, wherein the teacher models at least comprise a first teacher model and a second teacher model;
   a transceiver interface; and
   a processor, being electrically connected to the storage and the transceiver interface, and being configured to perform following operations:
   receiving a plurality of training images from the transceiver interface, wherein the training images correspond to an object category;
   performing a first object detection of the object category on the training images to generate a piece of first label information corresponding to each of the training images by the first teacher model, wherein each of the piece of first label information indicates at least one first object frame in each of the training images;
   training the student model based on the training images and the first label information;
   performing a second object detection of the object category on the training images to generate a piece of second label information corresponding to each of the training images by the second teacher model, wherein each of the piece of second label information indicates at least one second object frame in each of the training images; and
   training the student model based on the training images and the second label information, wherein a second object labeled quantity of the second label information corresponding to each of the training images is not less than a first object labeled quantity of the first label information corresponding to each of the training images;
   wherein the storage further stores a third teacher model, and the processor further performs following operations:
   performing a third object detection of the object category on the training images to generate a piece of third label information corresponding to each of the training images by the third teacher model; and
   training the student model based on the training images and the third label information, wherein a third object labeled quantity of the third label information corresponding to each of the training images is not less than the second object labeled quantity of the second label information corresponding to each of the training images.

2. The object detection model training apparatus of claim 1, wherein the second label information corresponding to each of the training images at least comprises the first label information corresponding to each of the training images.

3. The object detection model training apparatus of claim 1, wherein the third label information corresponding to each of the training images at least comprises the second label information corresponding to each of the training images, and the second label information corresponding to each of the training images at least comprises the first label information corresponding to each of the training images.

4. The object detection model training apparatus of claim 1, wherein each of the third label information at least comprises at least one third object coordinate corresponding to each of the training images, each of the second label information at least comprises at least one second object coordinate corresponding to each of the training images, and each of the first label information at least comprises at least one first object coordinate corresponding to each of the training images.

5. The object detection model training apparatus of claim 1, wherein the storage stores n teacher models, n is a positive integer not less than 2, and the processor further performs following operations:
(a) selecting an i-th teacher model from the n teacher models, and an initial value of i is 3;
(b) performing an i-th object detection of the object category on the training images to generate a piece of i-th label information corresponding to each of the training images by the i-th teacher model;
(c) training the student model based on the training images and the i-th label information, wherein a i-th object labeled quantity of the i-th label information corresponding to each of the training images is not less than a (i−1)-th object labeled quantity of a (i−1)-th label information corresponding to each of the training images; and
(d) determining whether i is equal to n, and setting i to i+1 when i is not equal to n.

6. The object detection model training apparatus of claim 5, wherein the processor repeatedly performs the operation (b), the operation (c), and the operation (d) until the processor determines that i is greater than or equal to n.

7. The object detection model training apparatus of claim 5, wherein the i-th label information corresponding to each of the training images at least comprises the (i−1)-th label information corresponding to each of the training images.

8. An object detection model training method, being adapted for use in an electronic apparatus, wherein the electronic apparatus comprises a storage, a transceiver interface and a processor, the storage stores a student model and a plurality of teacher models, the teacher models at least comprise a first teacher model and a second teacher model, and the object detection model training method is performed by the processor and comprises following steps:
receiving a plurality of training images, wherein the training images correspond to an object category;
performing a first object detection of the object category on the training images to generate a piece of first label information corresponding to each of the training images by the first teacher model, wherein each of the piece of first label information indicates at least one first object frame in each of the training images;
training the student model based on the training images and the first label information;
performing a second object detection of the object category on the training images to generate a piece of second label information corresponding to each of the training images by the second teacher model, wherein each of the piece of second label information indicates at least one second object frame in each of the training images; and
training the student model based on the training images and the second label information, wherein a second object labeled quantity of the second label information corresponding to each of the training images is not less than a first object labeled quantity of the first label information corresponding to each of the training images;

wherein the storage further stores a third teacher model, and the object detection model training method further comprises following steps:
performing a third object detection of the object category on the training images to generate a piece of third label information corresponding to each of the training images by the third teacher model; and
training the student model based on the training images and the third label information, wherein a third object labeled quantity of the third label information corresponding to each of the training images is not less than the second object labeled quantity of the second label information corresponding to each of the training images.

9. The object detection model training method of claim 8, wherein the second label information corresponding to each of the training images at least comprises the first label information corresponding to each of the training images.

10. The object detection model training method of claim 8, wherein the third label information corresponding to each of the training images at least comprises the second label information corresponding to each of the training images, and the second label information corresponding to each of the training images at least comprises the first label information corresponding to each of the training images.

11. The object detection model training method of claim 8, wherein each of the third label information at least comprises at least one third object coordinate corresponding to each of the training images, each of the second label information at least comprises at least one second object coordinate corresponding to each of the training images, and each of the first label information at least comprises at least one first object coordinate corresponding to each of the training images.

12. The object detection model training method of claim 8, wherein the storage stores n teacher models, n is a positive integer not less than 2, and the processor further performs following steps:
(a) selecting an i-th teacher model from the n teacher models, and an initial value of i is 3;
(b) performing an i-th object detection of the object category on the training images to generate a piece of i-th label information corresponding to each of the training images by the i-th teacher model;
(c) training the student model based on the training images and the i-th label information, wherein a i-th object labeled quantity of the i-th label information corresponding to each of the training images is not less than a (i−1)-th object labeled quantity of a (i−1)-th label information corresponding to each of the training images; and
(d) determining whether i is equal to n, and setting i to i+1 when i is not equal to n.

13. The object detection model training method of claim 12, wherein the object detection model training method further comprises following steps:
repeatedly performing the step (b), the step (c), and the step (d) until the processor determines that i is greater than or equal to n.

14. The object detection model training method of claim 12, wherein the i-th label information corresponding to each of the training images at least comprises the (i−1)-th label information corresponding to each of the training images.

15. A non-transitory computer readable storage medium, having a computer program stored therein, wherein the computer program comprises a plurality of codes, the computer program executes an object detection model training method after being loaded into an electronic computing apparatus, the electronic computing apparatus stores a student model and a plurality of teacher models, the teacher models at least comprise a first teacher model and a second teacher model, the object detection model training method comprises following steps:
- receiving a plurality of training images, wherein the training images correspond to an object category;
- performing a first object detection of the object category on the training images to generate a piece of first label information corresponding to each of the training images by the first teacher model, wherein each of the piece of first label information indicates at least one first object frame in each of the training images;
- training the student model based on the training images and the first label information;
- performing a second object detection of the object category on the training images to generate a piece of second label information corresponding to each of the training images by the second teacher model, wherein each of the piece of second label information indicates at least one second object frame in each of the training images; and
- training the student model based on the training images and the second label information, wherein a second object labeled quantity of the second label information corresponding to each of the training images is not less than a first object labeled quantity of the first label information corresponding to each of the training images;

wherein the electronic computing apparatus further stores a third teacher model, and the object detection model training method further comprises following steps:
- performing a third object detection of the object category on the training images to generate a piece of third label information corresponding to each of the training images by the third teacher model; and
- training the student model based on the training images and the third label information, wherein a third object labeled quantity of the third label information corresponding to each of the training images is not less than the second object labeled quantity of the second label information corresponding to each of the training images.

16. The non-transitory computer readable storage medium of claim 15, wherein the second label information corresponding to each of the training images at least comprises the first label information corresponding to each of the training images.

17. The non-transitory computer readable storage medium of claim 15, wherein the third label information corresponding to each of the training images at least comprises the second label information corresponding to each of the training images, and the second label information corresponding to each of the training images at least comprises the first label information corresponding to each of the training images.

* * * * *